Fig. 4

Inventors
Joseph B. Armitage
John B. Lukey
Kurt A. Riedel
Francis D. Boehmer
By W. D. O'Connor
Attorney April 10, 1951  J. B. ARMITAGE ET AL  2,548,188
MACHINE TOOL TRANSMISSION AND CONTROL MECHANISM
Filed Dec. 14, 1945  5 Sheets-Sheet 4

Inventors
Joseph B. Armitage
John B. Lukey, Kurt A. Riedel
Francis D. Boehmer
By W. D. O'Connor
Attorney Patented Apr. 10, 1951

2,548,188

UNITED STATES PATENT OFFICE 2,548,188

MACHINE-TOOL TRANSMISSION AND CONTROL MECHANISM

Joseph B. Armitage, Wauwatosa, and John B. Lukey, Kurt A. Riedel, and Francis D. Boehmer, Milwaukee, Wis., assignors to Kearney & Trecker Corporation, West Allis, Wis., a corporation of Wisconsin Application December 14, 1945, Serial No. 635,012

7 Claims. (Cl. 90—14)

This invention relates generally to improvements in machine tools, and more particularly to an improved automatic boring and milling machine.

A general object of the invention is to provide an improved boring and milling machine of the multiple spindle type.

Another object of the invention is to provide a multiple head milling machine with dog actuated electrical controls to effect a predetermined feeding cycle.

Another object of the invention is to provide a slidably mounted milling machine headstock with a dual drive means to feed the headstock.

Another object is to provide improved electrical means for controlling the operation of a plurality of motor driven tool elements.

Another object of the invention is to provide a machine having a plurality of spindles to simultaneously perform a multiple boring operation on a workpiece.

Another object of the invention is to provide a machine tool having a plurality of headstocks with feed control mechanism to operate said headstocks simultaneously or individually through a preselected feed cycle.

Another object of the invention is to provide an improved electrical control system for a machine tool including control switches operable from trip dogs adjustably positioned on a movable machine element.

A further object of the invention is to provide interchangeable multiple spindle head elements for use with a movable machine tool headstock.

Another object of the invention is to provide a screw and nut drive mechanism for a machine element wherein the screw is driven from one power source and the nut is driven from a second power source.

According to this invention, an improved milling and boring machine is provided, wherein a pair of tool retaining headstocks are slidably mounted in opposed relationship on a base with a work retaining table operably mounted on the base between the headstocks. Each of the headstocks may be actuated manually or by power by means of a nut and screw drive mechanism. The drive mechanism is driven from two power sources, one to provide a drive at a rapid traverse rate and the other to provide a feed drive at a selected one of a plurality of feed rates. The second power source also serves to drive a spindle actuating shaft at one of a plurality of speeds. This shaft, in turn, drives a multiple spindle gear train operably contained in a detachable head mounted on the headstock. The detachable head presents a plurality of tool retaining spindles, each positioned to simultaneously effect a desired boring or facing operation upon a workpiece clamped on the table. A rotatable table, built within the machine table, permits an operation to be performed on any face or combination of faces on the workpiece. The power sources for the feed and spindle drives of the two headstocks are electrically controlled and interlocked to provide any desired cycle of feed, and rapid traverse movement. The feed and rapid traverse drives are controlled by trip dogs adjustably carried on the headstocks and disposed to actuate switches in a control circuit. The control system also serves to effect a simultaneous spindle speed and feed reduction at a selected point of headstock travel, in order to permit a facing operation at the inner end of the boring cut. The depth of the boring or facing cut is determined by feeding the headstock against an adjustable positive stop with a safety clutch in the feed transmission serving to disrupt the power drive at the instant of contact.

The foregoing and other objects of the invention, which will become apparent from the following detailed description and claims, may be achieved by means of the exemplifying apparatus depicted in and described in connection with the accompanying drawings, in which:

The machine tool shown in the drawings is a boring and milling machine of the dual headstock and multiple spindle type with detachable heads carrying the multiple spindles on the headstocks. Each of the detachable heads is designed for a specialized multiple milling or boring operation, and may be readily changed. The machine, as shown, constitutes a preferred embodiment of the invention, although it should be understood that the various features of the invention may be utilized in other machines of different construction, with equal advantage.

Figure 1:
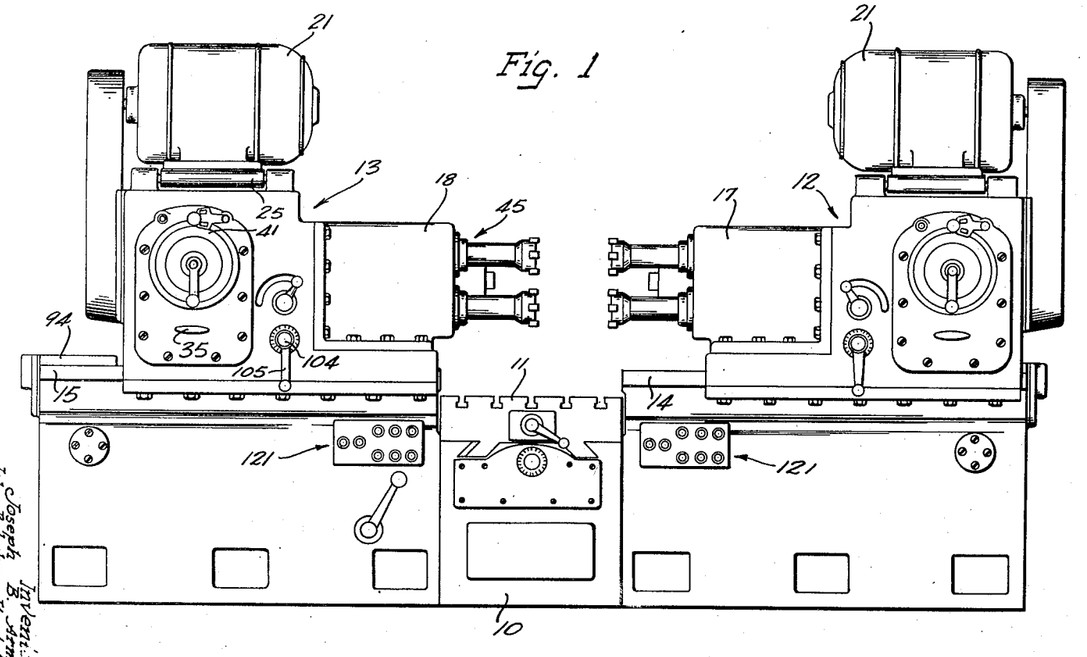
Figure 1 is a general view in front elevation of a boring and milling machine incorporating the invention.

Referring more specifically to the drawings, Fig. 1 thereof shows the boring and milling machine, constituting a complete embodiment of the invention described and claimed herein. Generally, the machine comprises a T-shaped hollow bed or base 10, constituting the main frame of the machine. The top side of the stem portion of the T base 10 supports a slidably mounted table or work retaining member 11. A screw and nut mechanism (not shown) serves to provide a manually operable means for effecting longitudinal movement of the table, in a well known manner.

The oppositely extending transverse portions of the bed 10 serve to slidably support a pair of tool headstocks 12 and 13. Thus, the headstock 12 is operably mounted on ways 14 on the right side of the table 11, while the headstock 13 is operably mounted on ways 15 on the left side of the table 11, as seen in Fig. 1. The headstocks 12 and 13 are arranged for power or manual movement on the ways 14 and 15 in a plane normal to the work retaining table 11. Detachable tool heads 17 and 18 are secured to the headstocks 12 and 13, respectively, in a manner to permit a unified movement of the head and headstock, and to present a plurality of cutter retaining spindles journalled therein to a workpiece fastened on the table 11. With the headstocks in axial alignment, boring operations may be simultaneously performed on opposite sides of the workpiece.

Since the drive and control mechanism in the two headstocks is identical, only the mechanism in the left headstock 13 is shown and hereinafter described in detail. Two independently driven transmissions 19 and 20 (see Figs. 2 and 5) are provided for each headstock. The headstock transmission 19 provides a selective power drive for the multiple spindles and an independently selective power drive to effect feeding movement of the headstock. The other transmission 20 serves to effect movement of the headstock at rapid traverse rate, and is contained in the machine base 10. An electrical control system is provided, whereby the four motors associated with the two headstocks 12 and 13 may be controlled to drive the tool spindles and effect movement of the headstocks at feed rate or at rapid traverse rate in either direction, independently. Two motors 21 and 22 are connected to drive the transmissions 19 and 20, respectively, for each headstock. Micro-switches mounted on the bed 10 are actuated through engagement with adjustable dogs bolted on the headstock housing, to provide accurate control of the headstock movement and, consequently, effect a plurality of precision boring operations in a predetermined cycle.

Figures 2, 3:
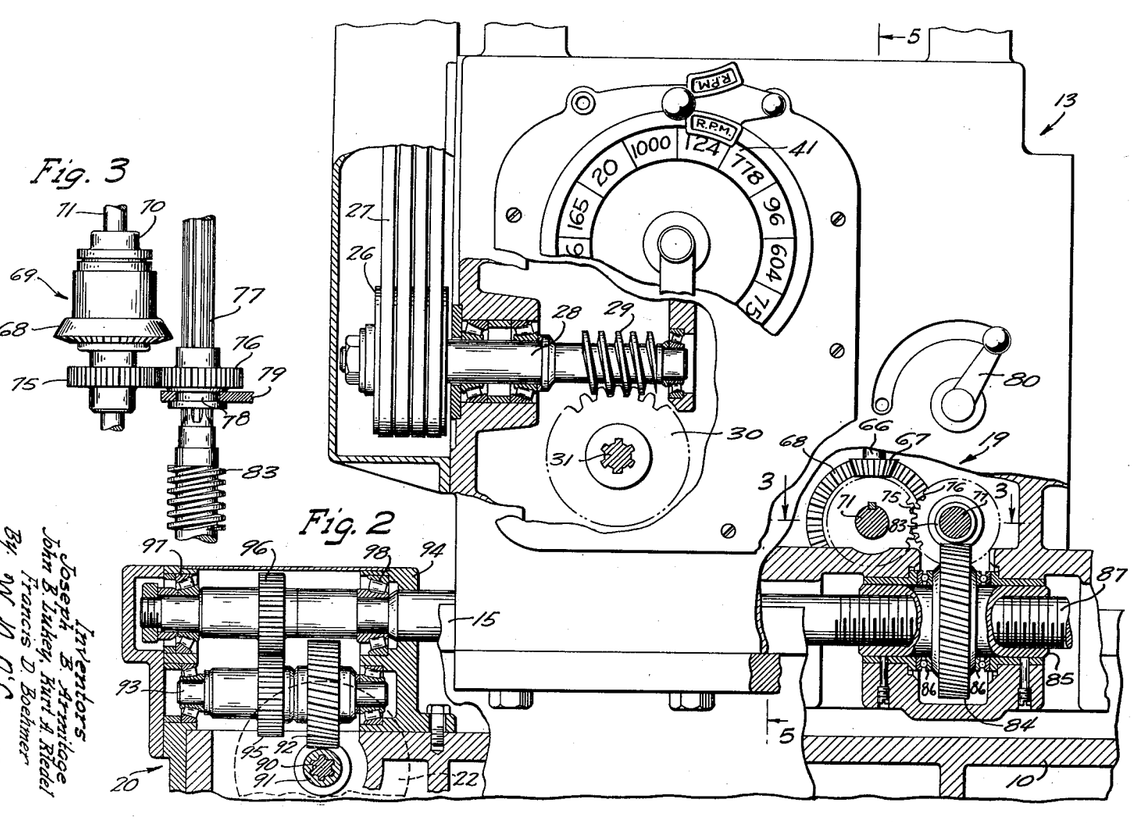
Fig. 2 is an enlarged view of the left headstock and base shown in Fig. 1, with parts broken away to show the rapid traverse drive mechanism in the base and the spindle and feed transmission drive mechanism within the headstock.
Fig. 3 is a detailed horizontal view of part of the feed transmission, taken on the plane represented by the line 3—3 in Fig. 2.
Figures 5, 6:
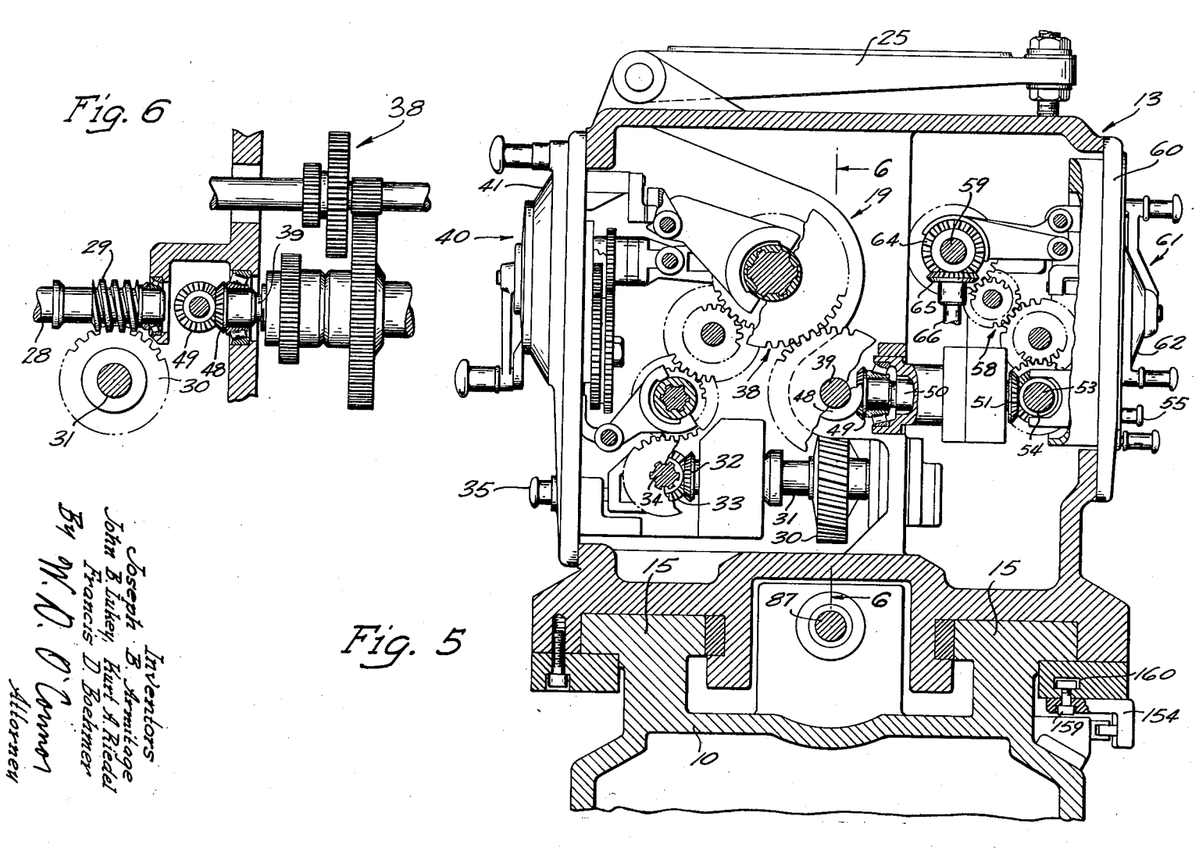
Fig. 5 is a transverse sectional view of the headstock spindle driving and feeding transmissions, taken substantially on the plane of the line 5—5 in Figs. 2 and 4.
Fig. 6 is a detailed longitudinal sectional view, taken in a vertical plane along the line 6—6 in Fig. 5, of the headstock transmission.

The spindle drive and feed drive motor 21 is carried on an adjustable motor mounting plate 25, pivotally mounted on the top of the headstock, as shown in Figs. 1 and 5. The motor 21 drives a pulley 26 through a plurality of V-belts 27, the tension of the belts being adjusted through the adjustment of the motor mounting plate 25. The pulley 26 is keyed on the outer end of a shaft 28, journalled in the headstock, as shown in Fig. 2. A worm 29, integrally formed on the inner end of the shaft 28, meshes with and drives a worm wheel 30 (see Figs. 2 and 6). The wheel 30, in turn, is fixedly carried on a shaft 31, journalled transversely of the headstock. A bevel or pinion gear 32, keyed to the shaft 31, is disposed between a pair of reversing bevel gears 33, as shown in Fig. 5. The reversing gears are rotatably carried on a shaft 34 with a shiftable clutch collar disposed between them for selective engagement, to provide a drive to the shaft 34 in either direction. A knob 35, on the front side of the headstock, may be selectively positioned to shift the reversing clutch, in a well known manner.

Figure 4:
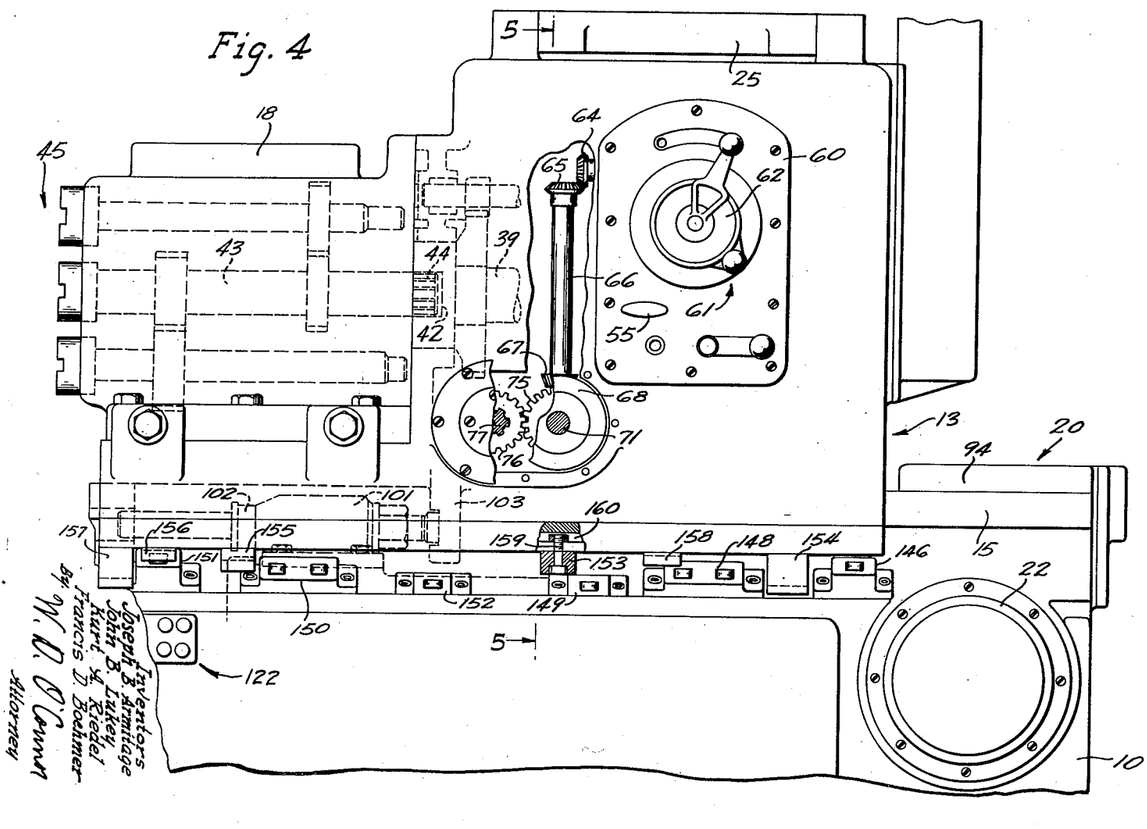
Fig. 4 is an enlarged rear view of the left headstock shown in Fig. 2 with the gear train for the multiple spindles and the dog actuated electrical controls shown.

A plurality of shiftable gears, constituting a gear train 38, are driven from the shaft 34 and are disposed within the headstock for axial movement in such a manner that they may be shifted to provide a plurality of speed drives to a spindle driving take-off shaft 39. A spindle speed selector 40, operably mounted on the front of the headstock, serves to shift the various gears in the gear train 38, in a well known manner, to provide the selected spindle speed, as indicated by the dial 41. The shaft 39 is journalled within the headstock with an internally splined socket 42 exposed on the inner end face of the headstock, as shown in Fig. 4. The detachable head 18, mounted on the front end of the headstock, is provided with a shaft 43, having an extending splined end 44, disposed to fit within the socket 42 when the head is properly positioned and clamped on the headstock. A plurality of cutter retaining spindles 45 are journalled within the head 18 and are driven from the shaft 43 through interconnecting gear trains.

In order to provide a positive relationship between the rate of rotation of the spindles 45 and the feed rate of headstock movement for thread cutting or the like, the power source for the headstock feed transmission is taken directly from the spindle driving take-off shaft 39. As shown in Figs. 5 and 6, a bevel gear 48 is keyed to the inner end of the shaft 39 and meshes with a mating bevel gear 49. This gear, in turn, drives a shaft 50 which carries, at its other end, a gear 51 disposed between, and meshing with, a pair of reversing gears rotatably journalled on a shaft 53. A clutch collar 54, slidably splined on the shaft 53, between the reversing gears 52, may be selectively positioned to engage either one of the two gears to provide a driving connection to the shaft 53 in either direction. The clutch collar 54 may be selectively positioned, through the manipulation of a feed reverse handle 55, to either one of two positions. The feed reversing mechanism is provided in order to permit a forward or reverse feed movement of the headstock in relation to the clockwise or counterclockwise rotation of the spindle shaft 39, as may be required for a particular machining operation. A plurality of gears, constituting a feed gear train 58, are driven from the shaft 53. Certain of the gear clusters in the gear train are axially shiftable to selectively provide a plurality of feed rate drives to a shaft 59. The gear train 58 is carried in a feed box frame 60, which is detachably mounted on the back side of the headstock. Thus, the entire unit may be readily removed from the headstock for servicing. A feed selector mechanism 61, also carried in the feed box frame 60, provides means to shift the various gear clusters in the gear train 58 into the various neutral or driving positions. The machine operator may manipulate the selector mechanism 61 in a well known manner, in order to select a desired feed rate, as indicated on a dial 62. A bevel gear 64, keyed to the shaft 59, meshes with a bevel gear 65, keyed to the upper end of a vertically disposed shaft 66, journalled within the headstock, as shown in Figs. 4 and 5. At the lower end of the shaft 66, a bevel gear 67 meshes with a ring gear 68, constituting the driving member of an overload clutch mechanism 69, as best shown in Fig. 3. A driven member 70 of the clutch mechanism is keyed to a horizontally disposed shaft 71, journalled within the headstock, as shown in Figs. 2, 3 and 4. Likewise keyed to the shaft 71 is a gear 75, which meshes selectively with and drives a gear 76, fitted on a splined shaft 77. The gear 76 is axially slidable on the shaft 77 to either a position of engagement with the gear 75 or a neutral or disengaged position. The hub of the gear 76 is provided with a groove 78, which receives a shifter fork 79. The fork 79 is manually operable through a lever 80 operably mounted on the front side of the headstock. The lever 80 may be positioned in an engaging position, in which the gear 76 is engaged with the gear 75 to provide a power drive to a worm 83, integrally formed with the spline shaft 77, or in a disengaged position in which the feed drive to the shaft 77 is disconnected. The worm 83 drives a worm wheel 84, integrally formed on the outer periphery of a nut element 85 journalled in bearings 86 on the bottom side of the headstock, as shown in Fig. 2. The nut 85 threadably engages a feed screw 87, which is operably journalled parallel with and between the way surfaces 15 in the bed 10. When the worm wheel 84 is driven at a preselected feed rate, the driving engagement between the nut 85 and the screw 87 will effect longitudinal movement of the headstock 13 on the horizontally disposed ways 15 in either direction. Thus, the headstock 13 may be operated at a predetermined feed rate, relative to the speed rate of the cutter spindles 45.

The headstock 13 may also be driven at a rapid traverse rate, in order to rapidly advance the cutters toward the workpiece or to withdraw the cutters, after an operation is finished. The rapid traverse transmission 20, as shown in Figs. 2 and 4, is disposed in the outer end of the base 10, intermediate the ways 15. The transmission 20 is driven by the motor 22, mounted on the back side of the base 10. The extending end of a motor shaft 90 is splined to receive a worm 91, journalled within the base 10. The motor 22 may be readily removed from the machine, without disturbing the rapid traverse transmission 20. The worm 91 engages a worm wheel 92, keyed on a shaft 93, as shown in Fig. 2. The shaft 93 is journalled in a transmission casing 94 bolted to the bed 10, intermediate the ways 15. A spur gear 95, likewise keyed to the shaft 93 adjacent to the worm wheel 92, meshes with a gear 96, fixedly carried on the end of the screw shaft 87. The screw shaft 87 is journalled in bearings 97 and 98, mounted in the rapid traverse transmission casing 94. Since the rapid traverse motor 22 is designed to operate at a constant speed, the screw shaft operates to move the headstock at a predetermined rapid traverse rate.

When the rapid traverse motor is energized to drive the transmission 20 and, consequently, the screw shaft 87 at a rapid traverse rate in either direction, the nut element 85 is not actively driven and the rotative force from the screw will be imparted to the nut to effect movement of the headstock. Since the nut element 85 is driven directly from the worm 83 and the worm wheel 84, the rotative force imparted to the nut will not cause it to turn with the screw, but rather the worm 83 will serve to lock the wheel 84 and nut 85 against rotation.

However, when the headstock is moved at feed rate, the nut 85 is driven from the headstock transmission to rotate on the screw shaft 87, and the screw shaft is prevented from turning by the self-locking worm 91 and worm wheel 92. Furthermore, the electrical controls for the machine are then set to energize an electrical brake built into the rapid traverse motor 22 and lock the motor 22 and the screw shaft 87 to which it is connected against rotation. Thus, the headstock will be moved along the way surfaces at a selected feed rate. Since each of the drives is independently driven and geared, it is possible that both could be operating simultaneously, without causing any damage, although the electrical control circuit, as will be hereinafter fully described, will obviate such a possibility during a normal operating cycle.

A positive stop device 101 is mounted on the base intermediate the way surfaces 15, as shown in Fig. 4. The device 101 is adjustably mounted and is provided with a micrometer dial 102 in a manner to permit an exact adjustment of the stop in a well known manner. The stop serves to engage an extending arm portion 103 integrally cast with the headstock casing, whenever the headstock is advanced to a preselected foremost position. Thus, at the completion of a boring or facing operation, the headstock will be fed against the positive stop device 101 and effect a cutting operation to a known distance. When the feed movement of the headstock is disrupted through the abutment of the arm portion 103 against the positive stop device, the overload clutch 69 will serve to interrupt the feed drive to the nut element 85, without straining any of the driving elements in the transmission 19.

When the machine is being set up for a particular milling or boring operation, the headstocks may be manually fed along the way surfaces. As shown in Fig. 1, an extending portion 104 of the nut rotating shaft 77 on the front side of the headstock is adapted to receive a crank 105. The shaft 104 is provided with an adjustable micrometer dial to permit precise adjustments of the headstock along the way surfaces.

The operating cycles of the spindles and headstocks of this machine are effected entirely through electrical control elements interconnected to constitute an automatic electrical control system. Although the machine, as shown, includes two electrically controlled headstocks, a machine incorporating the principles of this invention can be built with a single headstock or several pairs of headstocks disposed along a power driven table having an automatic control cycle synchronized with the operating cycles of the headstocks. Generally, the cycle of a boring operation includes the advancement of the cutters to the workpiece at a rapid traverse rate and then a feeding movement at a desired feed rate while the cutter is operating on the workpiece. If a facing operation is necessary at the end of the bore, the controls may be predeterminately set to reduce the cutter speed and feed rate during such an operation. When the cut is completed, the headstock is moved at rapid traverse rate, back to its outermost position. If the areas to be cut in the workpiece are spaced, the controls may be adjusted to advance the cutters automatically from one such area to the next, at rapid traverse rate.

Figure 7:
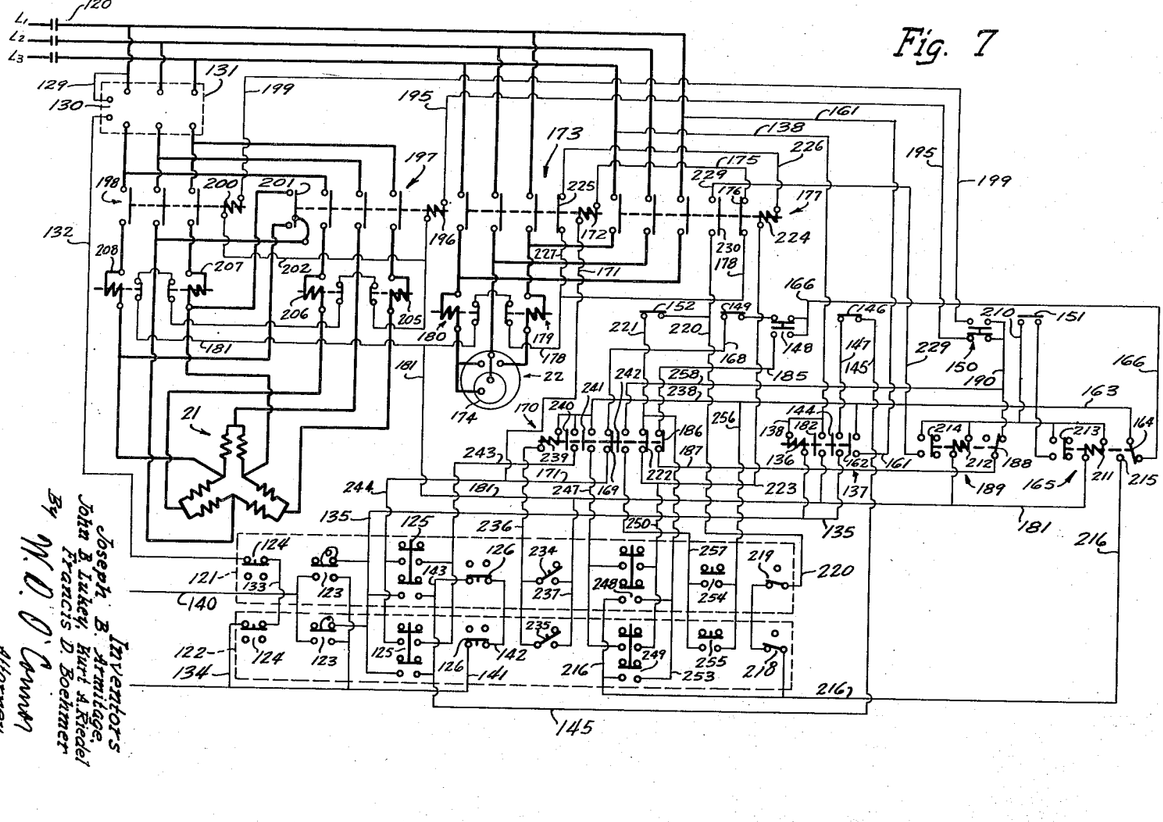
Fig. 7 is a schematic circuit diagram of the electrical control system for the spindle drive and feed motors and the rapid traverse motors.

The electrical circuit required to accomplish the automatic control of a single headstock is diagrammatically shown in Fig. 7. The circuit for each additional headstock is identical, the several circuits being interconnected through the master switches, as hereinafter fully explained.

Electrical energy for the headstock motors 21 and the rapid traverse motors 22 and for the other electrical equipment in the circuit is derived from a power source indicated by the line conductors $L^1$, $L^2$ and $L^3$ in the circuit diagram. A master switch 120, connected to the line conductors, serves to control all current flowing into the circuit.

As shown in Figs. 1 and 4, each headstock is operated from a control station 121 or 122 located, respectively, on opposite sides of the extending portion of the bed 10, immediately adjacent the table 11. These positions afford the greatest accessibility to the operator, while setting up the machine or during the cutting operations. In addition, multiple operation of the headstocks may be effected from any of the corresponding control stations similarly positioned for each of the other headstocks.

In the circuit diagram (Fig. 7), the manually operated switches in the top row are mounted in control station 121, while the switches in the bottom row are mounted in control station 122.

As a preliminary to operating the headstock motors 21 it is necessary to energize a control circuit. This circuit may be controlled from a dual start button 123 or dual stop button 124, mounted in each of the control stations on the machine. In addition, this circuit may be controlled from a head start button 125 and a head stop button 126, but only from the two control stations directly associated with the headstock, which is to be operated. Thus, the dual startstop switch buttons 123 and 124, at any of the control stations on the machine, may be actuated to effect multiple operation of all of the headstocks while the head start-stop buttons 125 and 126 each serve to effect operation of a single headstock.

If the control circuit is to be energized by actuating either of the dual normally open start buttons 123 at the front or rear control stations 121 or 122, a current flow originating from the line conductor $L^1$ would be established through a line 129 to a normally closed interlocking switch 130 in a reversing drum 131. Thence, through a line 132 to the dual stop switch 124 at the control station 121, the normally closed switch and a line 133 serially connecting the switch with the dual stop switch at the control station 122. Thereafter, a line 134 conducts the current to one terminal on each of the two normally open dual start switches 123 in the stations 121 and 122, respectively. The momentary closing of one of the dual start switches will permit a current flow through the switch and a line 135 to an operating solenoid 136 of a control relay 137. The solenoid is connected to the line conductor $L^3$ by a line 138, and when thus energized, the relay will be actuated to a closed position. When either of the dual start buttons is depressed, a circuit is also established from the line 134 to a line 140, which connects with a solenoid in each of the other control relays (not shown) identical to the control relay 137 and associated with similar control circuits for each of the other headstocks. Consequently, the depression of any of the dual start buttons, at any one of a plurality of headstock stations, will cause each of the headstock control relays to be energized and closed.

If, on the other hand, only one headstock control circuit is to be utilized, the operator can energize the control relay 137 by actuating one of the headstock start switches 125 at either the front or rear control station for the particular headstock. Thus, in the instant case, in order to energize the relay 137 in the left headstock control circuit, as shown in Fig. 7, the actuation of one of the switches 125 would cause a current flow from the line $L^1$ through the dual stop switches 124 and the line 134, as previously explained, to a line 141 and a pair of normally closed head stop switches 126 connected in series by a conductor 142. Thereafter, the current will flow to each of the head start switches 125, via a line 143 and through the closed switch to the line 135 connecting with the solenoid coil 136 in the control relay 137 to effect mechanical movement of the relay to a closed position. Since the dual start switches 123 remain open, the line 140 to the other headstocks is not energized.

The closure of the relay 137 establishes a holding circuit to retain the relay in a closed position, until such time as the current flow to the solenoid coil 136 is disrupted to effect an opening of the relay. The establishment of the holding circuit by the closure of a contact plate 144 in the control relay 137 permits a current flow from the line conductor $L^1$ to the dual stop switches 124, the lines 134 and 141, the serially connected head stop switches 126, and the line 143, as previously explained, then through a line 145, a normally closed dog actuated limit switch 146 and a line 147, connecting with one terminal associated with the plate 144. Since the other terminal is connected to the line 135, the flow to the control relay solenoid 136 will continue in shunt relationship with the starting switches 125, to effect the retention of the relay 137 in a closed position.

The energization of the control circuit up to the aforedescribed stage, must occur, in each instance, before any cycle of machine operation can be initiated. However, the further operation of the control circuit is dependent upon the selective manipulation of various switches at the control stations and upon the operation of a series of limit switches predeterminately set to function in a desired sequence. Six limit switches 146, 148, 149, 150, 151 and 152, as shown in Fig. 4, are mounted along the top rear edge of the extending portion of the bed 10. Each switch is operably disposed to be actuated through engagement with one of the adjustably mounted trip dogs or actuators 153 to 158 (see Figs. 4 and 5). The trip dogs are adjustably retained in position on the movable headstock through a T-bolt and nut 159, slidably retained in a T-slot 160 in a well known manner. Thus, the positioning of each of the trip dogs, to effect the manipulation of its associated limit switches, provides for actuating the several switches in a predetermined sequence during the cycle of headstock movements, to complete or open various circuits, as will hereinafter be more fully explained.

Thus, for example, the first movement of the headstock is generally at rapid traverse rate, in order to advance the cutters into the proximity of a workpiece on the table 11 and start a cutting operation. The closure of the control relay 137 permits a current flow from the line conductor L¹, through a line 161 and an engaged control relay plate 162 to the conductor 163. This conductor, in turn, connects with a movable plate 164, in a timing relay switch 165. Normally, the plate 164 is positioned to permit a current flow to a line 166, which connects with the double-pole, single-throw limit switch 148, known as the feed limit switch. When the headstock 13 is advancing, the switch 148 is positioned, as shown in Fig. 7, to permit a flow to the normally closed limit switch 149 and a conductor 168. This conductor is connected to permit a current flow across a contact plate 169, associated with an inching relay 170, the plate 169 being retained in a closed position as long as the relay 170 remains deenergized. From the plate 169, the current is directed to a line 171 connected to an actuating solenoid 172 which, when energized, closes a "forward" rapid traverse motor switch 173 that functions to energize the rapid traverse motor 22 from the line conductors L¹, L² and L³, and thus effect forward rapid traverse movement of the headstock.

The circuit is completed from the solenoid 172 through a line 175 connecting with a safety interlock 176 in a "reverse" rapid traverse motor switch 177. The interlock 176 permits a passage of current only when the switch 177 is deenergized. Whenever the switch 177 is energized to effect a reverse movement of the headstock, the circuit to the "forward" solenoid 172 is broken. Thus, it is impossible to close the "forward" and "reverse" motor switches 173 and 177 simultaneously or to close one when the other is already closed. Thereafter, the current is directed through a line 178 to a pair of serially connected overload relays 179 and 180, operably connected in the rapid traverse motor circuit. These relays serve to open the control circuit to the motor switches 173 and 177 whenever an overload occurs on the rapid traverse motor 22. The circuit is completed through a common return line 181 connecting with the relay 180, which in turn, connects with the line 138 and the conductor L³, via a contact plate 182 in the control relay 137. It is evident that the circuit is broken whenever the control relay 137 is in an open position, since the contact plates 162 and 182 are displaced to interrupt the flow of current.

The headstock will continue to be rapid traversed forwardly until either one of the limit switches 148 or 149 is actuated by its associated predeterminately set trip dog 153 or 154, respectively, carried on the headstock. Thus, if the limit switch 149 is actuated by the dog 154, the circuit is disrupted and forward movement of the headstock at rapid traverse rate will be halted. Since such an actuation of the switch 149 does not complete another circuit, further operation of the machine is dependent upon the manipulation of one of the start buttons at one of the control stations 121 and 122. However, in the arrangement of dogs shown in Fig. 4, the dog 154 is positioned out of the range of the switch 149 and, consequently, never strikes it.

Directly connected to the rapid traverse motor 21 is an electric brake 174 designed to be operable whenever it is deenergized. It is energized from the rapid traverse motor conductors, as shown in Fig. 7. Thus, whenever the rapid traverse motor is energized to drive the headstock 13 in either direction, the brake is off and the feed screw 87 is free to be rotatively driven. But when the motor 21 is deenergized, the brake is set to lock the screw 87 and hold it stationary, to permit the nut element 85 to be rotatively driven on the screw and provide feed movement of the headstock, at a preselected feed rate. The brake 174 is instantaneous in responding and, consequently, prevents over-travel of the headstock after the limit switch is opened.

To provide a continuous operating cycle for the machine, the trip dog 153 actuating the feed limit switch 148 may be predeterminately adjusted to actuate the switch from the position shown in Fig. 7 to break the circuit to the forward motor switch 173 and, consequently, to deenergize the rapid traverse motor 22. The switch 148 is of the double-pole, single-throw type and when it is so actuated by the dog 153 on the forward pass of the headstock, a second circuit is completed through it from the line 166 to a line 185 connected to one of a pair of terminals associated with a normally closed contact plate 186 in the inching relay 170. The position of the plate determines the current flow to a line 187, which is connected to a movable contact plate 188 in a spindle motor timing relay switch 189. Normally, the plate 188 is positioned to conduct current to a line 190 and the double-throw, single-pole limit switch 150. The positioning of the switch 150 determines the speed at which the motor 21 is to operate. At the start of an operating cycle, the switch 150 is positioned, as shown in Fig. 7, to energize the motor 21 for high speed operation, while the cutters are to be used for boring purposes. When thus positioned, current flows from the plate 188 in the timing relay 189 to the limit switch 150, as previously explained, and thereafter, via a conductor 195 to a solenoid coil 196 disposed, when energized, to connect the motor 21 to the line conductors L¹, L², and L³ for operation at high speed upon actuation of a high-speed motor starting switch 197. If a facing operation is necessary at the end of the bore on the workpiece, a trip dog 155 is set to trip the limit switch 150 to open the circuit to the high-speed switch 197 and to close a circuit to a low-speed motor starting switch 198, by permitting a current flow through a line 199 to an actuating solenoid 200. The speed control switch 150 will operate in this manner only upon a forward pass of the dog 155 mounted on the headstock.

The spindle and feed drive motor 21 is preferably of a two speed constant torque, single winding type. When the high-speed motor switch 197 is closed through energization of the solenoid 196, the motor 21 is energized to run at a high speed and the cutter spindles and headstock feed drive mechanism driven thereby will operate at the speed and feed rates as selectively indicated on the spindle speed selector and feed selector dials 41 and 62. But, when the low-speed motor switch 198 is closed, the windings in the motor 21 are energized in a manner to effect a power drive at a reduced speed. In the particular case, the speed is reduced to one-half and, consequently, the spindle speed and headstock feed rate is reduced accordingly. Whenever the high-speed motor switch 197 is closed, an auxiliary contact plate 201 therein closes and shorts out the low-speed motor circuit on the motor side of the switch 198, which is then open. In addition, the usual interlocking means (not shown) is provided for the motor switches 197 and 198, to prevent the possibility of having both switches closed at the same time.

The previously mentioned reversing drum 131 is manually operable to change the phase setting of the line conductors $L^1$, $L^2$ and $L^3$ and, consequently, serves to selectively effect reversal of the motor 21, as may be required for a particular cutting operation. The reversal thus effected in both the high and low speed range is used primarily to control the direction of rotation of the cutter spindles, with the direction of headstock feed movement being controlled mechanically by the manipulation of the feed reverse handle 55, as previously explained. Since the electrical interlock 130 in the drum 131 is serially connected with all of the stop switches in the control panels 121 and 122 and is arranged to be opened upon movement of the drum, any change in the setting of the reversing drum will result in opening the holding circuit for the control relay 137 and, consequently, will instantly deenergize all of the motors in the same manner as if any of the stop switches were depressed.

The circuit from the two actuating solenoids 196 and 200 in the motor switches 197 and 198 is completed through a connecting line 202 which, in turn, is connected to one of four serially connected overload relays 205, 206, 207 and 208, electrically disposed in the high and low speed motor circuits, in a well known manner, to effectively break the circuit to the motor switch solenoids 196 and 200 upon the occurrence of an overload and thus disconnect the motor 21 from the line conductors $L^1$, $L^2$ and $L^3$. Thereafter, the circuit extends through the common return line 181 and the contact plate 182 in the closed control relay 137 to the line 138 and the conductor $L^3$.

The duration of any cutting operation may be electrically controlled by the two timing relays 165 and 189. The depth of a bore or the limits of a facing operation on a workpiece are precisely determined by feeding the headstock 13 against a predeterminately set positive stop device 101 adjustably mounted in the bed 10, as previously described. Thus, while the forward movement of the headstock will be halted, the headstock motor 21 will continue to drive the cutter spindles for a predetermined period of time under control of the timing relays, even though the headstock 13 may already be moving rearwardly, as effected by the energization of the rapid traverse motor 22 in reverse. In this manner, the workpiece may be precision cut to a predetermined depth, but the usual cutter marks and scratches resulting from withdrawing a non-rotating cutter from a work-piece are eliminated.

After the motor 21 has been energized to rotate the cutters and effect movement of the headstock 13 at feed rate in a cutting operation, a predeterminately set trip dog 156 will actuate the normally open limit switch 151 to close a timing relay circuit whereby both of the relays 165 and 189 are energized. Means (not shown) are provided in each relay to selectively vary the time factor in which the relay will function, after it is energized. When the limit switch 151 is closed, a flow of current is set up from the conductor $L^1$, the line 161, the contact plate 162 of the control relay 137 and the line 163 through the switch 151 to a timing switch supply line 210. This line connects with actuating solenoids 211 and 212 in the timing relays 165 and 189, respectively. The circuit from the solenoids is completed through the common return line 181, the contact plate 182 in the contact relay 137 and the line 138 to the line conductor $L^3$.

The operation of the timing relay sets up a holding circuit whereby current is fed directly from the line 163 through contact plates 213 and 214 in the timing relays 165 and 189, respectively, and the line 210 connecting with each of the timing solenoids 211 and 212 in shunt relationship with the limit switch 151. The circuit from the two solenoids is completed through the common return line 181, as before. The operation of timing relay 189 serves to actuate the plate 188 from the position shown in Fig. 7, and, consequently, serves to interrupt the circuit to the limit switch 150 and the spindle and feed headstock motor 21. When this occurs, the motor 21 is deenergized to stop further rotation of the cutters and movement of the headstock.

Actuation of the timing relay 165 to a closed position serves to effectively move the contact plate 164 from the position shown in Fig. 7 into contact with a terminal 215. Such movement serves to interrupt the circuit from the supply line 163 to the line 166 and the limit switch 148. Thus, it would not be possible to effect closure of the "forward" rapid traverse motor starting switch 173 or to energize either of the headstock motor starting switches 197 and 198 to operate the motors 21 and 22, as aforedescribed.

The timing relay 165 is brought into operation when a machining cycle requires that the cutter be withdrawn from contact with a workpiece while the cutter is rotating. By adjusting the timing element in the relay 165, the time interval during which forward rapid traverse, or forward or reverse feed movements of the headstock occur may be positively controlled.

The movement of the timing relay contact plate 164 into engagement with the terminal 215 directs a current flow from the line 163 to a line 216, which connects with one of a pair of serially connected hand or automatic selection switches 218 and 219. These switches serve to provide for automatic cycle control of the rapid traverse return movement of the headstock. If either is set for "hand" control, the circuit is interrupted and the return movement must be initiated each time by the manipulation of other switches, herein after described. With the switches in the closed automatic position, as shown in Fig. 7, the current is free to flow from the switches to a line 220, which is connected to a normally closed limit switch 152. With the presently described machining operation, the switch 152 is not used for control purposes. However, it serves to break a circuit to the "reverse" rapid traverse switch 177, when it is necessary to halt the rearward movement of the headstock 13 at rapid traverse rate, in order to provide for a feed movement of the headstock during the return portion of the operating cycle. Thus, with the tripping setup shown in Fig. 4, the trip dog 157, which would be used to actuate this switch is positioned out of the operating range of the limit switch.

After passing through the switch 152, the current is carried via a conductor 221 and a normally closed contact plate 222 in the inching relay 170 to a line 223, which in turn connects with an actuating solenoid 224 in the "reverse" rapid traverse motor switch 177. From the solenoid 224, the current is directed to an interlock 225 in the "forward" rapid traverse motor switch 173 through a line 226. When the "forward"

switch 173 is in open position, the interlock 225 is positioned to permit the passage of current to a line 27, which connects with the line 178. The interlocks 176 and 225 in the motor switches 177 and 173, respectively, serve as an electrical safety device to prevent the closure of either motor switch when the other is already closed. As previously described, the circuit from the motor switches 173 and 177 is completed through the line 178, the overload relays 179 and 180, the common return line 181, the contact plate 182 in the control relay 137 and the line 138 to the line conductor $L^3$.

When the "reverse" motor switch 177 is closed, the rapid traverse motor 22 is energized to effect rearward movement of the headstock assembly 13 at rapid traverse rate. A holding circuit is set up upon the closure of the motor switch 177 whereby current is directed from the supply line 163 to a line 229, which connects with a holding interlock 230 in the motor switch 177. With the interlock 230 in a closed position, the circuit extends through the line 220, the limit switch 152, the line 221, the inching relay contact plate 222 and the line 223 to the actuating solenoid 224 of the "reverse" motor switch. Thus, the solenoid 224 continues to be energized and the motor switch 177 is retained in a closed position. The rapid traverse motor 22 continues to drive the headstock rearwardly until the fixed dog 158 (see Fig. 4) actuates the limit switch 146. Thus, the normally closed switch 146 is opened to break the holding circuit to the control relay 137 and disconnect both motors from the line conductors $L^1$, $L^2$ and $L^3$. During the rearward movement of the headstock at either feed or rapid traverse rate, the trip dogs 153 and 155 reactuate the limit switches 148 and 150, respectively, in order to reset the switches for the next operating cycle. The other limit switches 146, 149, 151 and 152 automatically return to their normal position after the associated trip dog has passed and, consequently, do not need resetting.

Briefly reviewing the cycle just described, the control circuit is energized when the operator actuates either of the dual starting switches 123 or the head starting switches 125 at either of the control stations 121 and 122 to energize and close the control relay 137. The closure of the relay 137 establishes a circuit from the line conductor $L^1$ through the relay contacts and a timing relay 165 to a pair of limit switches 148 and 149. With the switches positioned as shown in Fig. 7, a circuit is established to energize the "forward" rapid traverse relay 172 and effect a forward movement of the headstock at rapid traverse rates. Such movement will continue until a trip dog 154 operates the switch 149 to halt all forward movement, or until a trip dog 153 strikes the switch 148 to redirect the current through the inching relay 170, the timing relay 189 and the limit switch 150 to one of the starting switches 197 and 198, associated with the spindle motor 21. The direction of rotation of this motor is dependent upon the position of the reversing drum 131 while the rate of rotation is dependent upon the positioning of the limit switch 150. For boring operations, the switch 150 is positioned to energize a high speed circuit, while for facing operations the switch 150 is tripped by a dog 155 to energize a slow speed motor circuit.

The cycle of headstock operation is automatically continued when the headstock has reached a predetermined forward position whereat a trip dog 156 will actuate the limit switch 151 to energize both of the timing relays 165 and 189. If the relay 189 is set to control the cycle, the spindle feed motor 21 will continue to be energized for a predetermined period of time and then be disconnected from the line to complete the cycle. Whereas, if the relay 165 is set to control the cycle, the motor 21 will continue to be energized for a predetermined period of time, after which the relay 165 will function to energize a "reverse" rapid traverse motor switch 177 to start the motor 22 and effect rearward movement of the headstock at rapid traverse rate. Rearward movement of a headstock may be stopped at any point, if the trip dog 157 is set to operate the limit switch 152 and such movement is positively stopped when the fixed dog 158 actuates the limit switch 146 to open the control relay 137 and complete the cycle of operation.

The aforedescribed cycle of operation is only one of several which can be set up on this machine. By predeterminately setting the trip dogs on each of the machine headstocks, a fully automatic operating cycle can be established for each headstock. Any combination of feed and rapid traverse headstock movements can be effected for either forward or rearward travel. In addition, several control combinations may be introduced for either boring or facing operations. A similar power feed and rapid traverse drive mechanism may be applied to effect precisely controlled movement of the table or work retaining member 11 to permit a sequential series of operations along transverse paths or on each of a plurality of workpieces.

In order to facilitate setting up the machine for a desired cutting operation, an additional set-up control circuit is provided to assist the machine operator in making various adjustments and changes in the control cycle, such as precisely adjusting the trip dogs 153 to 158, inclusive. By positioning either one of two run-inch switches 234 and 235 from the position shown in Fig. 7, into an "inch" position to permit current flow from a line 236 to a line 237, an energizing circuit is set up for the inching relay 170. Thus, with the control relay 137 closed, a current will pass from the line conductor $L^1$, the line 161, and the control relay contact 162 to the line 163 and a line 238 connecting with an actuating solenoid 239 in the inching relay 170. Thence, through the line 236, the closed run-inch switch and a line 237 joining with the common return line 181. Thereafter, the current flows through the closed control relay plate 182 and the line 138 to the line conductor $L^3$, as previously explained.

When the inching relay 170 is actuated to a closed position, all of the previously mentioned circuits extending through the contact plates 169, 186 and 222 therein are broken because these plates are moved to an open position. Simultaneously, three other contact plates 240, 241 and 242 are moved to permit a current flow in the setup control lines. As long as the solenoid 239 is energized, the plates 240, 241 and 242 are retained in a closed position. Thus, with the plate 240 closed, current is free to flow from the control relay 137 and the lines 163 and 238 through the plate 240 to a wire 243 connecting with the head start switches 125 in the control stations 121 and 122. When either of these switches is manually depressed, the current will flow through a line 244, which connects with and conducts current to the line 171 and the actuating solenoid 172 in the "forward" rapid traverse motor switch 173. Since a holding circuit is not provided, the rapid traverse motor 22 will be energized to effect forward movement of the headstock 13 at rapid traverse rate only as long as one of the head start switches 125 remains depressed.

In addition, with the inching relay 170 and the control relay 137 both closed, a circuit is established from the conductor $L^1$ through the lines 161, 163 and 238 to the inching relay contact plate 241 and through a line 247, which connects with a pair of head return switches 248 and 249, disposed in the control stations 121 and 122. When either of the push button switches 248 or 249 are depressed, current will flow from the line 247 through the switch to a line 250, which connects with the line 223. With the contact plate 222 in the relay 170, then open, the current flow will be directed via the line 223 to energize the solenoid 224 in the "reverse" motor starting switch 177. The rapid traverse motor 22 will be connected to the supply lines $L^1$, $L^2$ and $L^3$ to start the motor and effect movement of the headstock 13 rearwardly until the operator releases the depressed head return switch. Manual operation of the switch is necessary in order that the machine operator may cause the headstock 13 to move rearwardly, as selected, for short distances while setting up the machine for an operating cycle.

To complete an operating cycle, the head return switches 248 and 249 may be manipulated to selectively effect rearward movement of the headstock 13 at rapid traverse rate. For example, if a facing operation is required during the return movement of the headstock, the operator adjusts the operating cycle to halt all rearward movement of the headstock upon completion of the facing operation, in order to provide for removing the cutter from the spindle 45. For such an operation, one of the previously mentioned hand automatic switches 218 or 219 is positioned to open the circuit from the line 216 to the line 220 and prevent the automatic energization of the rapid traverse motor 22 for rearward headstock movement. Thereafter, in order to effect such movement of the headstock, the operator actuates one of the head return switches 248 or 249. Thus, the current passing through the contact plate 164 of the closed timing relay 165 would flow from the line 216 through one of the switches 248 or 249 to a line 253. This line, in turn, connects with the line 221, through which the current flows to the inching relay contact plate 222 and the line 223. The solenoid 224 in the "reverse" rapid traverse motor switch is thus energized from the line 223 to effect energization of the rapid traverse motor 22 for "reverse" movement of the headstock.

Thereafter, the holding circuit, as previously explained, becomes effective to retain the "reverse" motor switch 177 in a closed position. The rapid traverse motor 22 continues to drive the headstock rearwardly until either of the limit switches 146 and 152 is actuated by a trip dog or one of the stop switches 124 and 126 is manipulated by the operator.

When the inching relay 170 is retained in a closed position through the closure of either of the run-inch switches 234 and 235, as previously explained, the contact plate 242 in the relay is also closed to permit selective control of the motor 21 to inch the cutter retaining spindles 45. With the control relay 137 closed, a current flow from the conductor $L^1$ is established to two spindle inch switches 254 and 255 in the control stations 121 and 122 via the line 161, the closed control relay contact 162, the line 163 and 238 and a line 256 connected to the inching switches. Any actuation of either of the inching switches 254 or 255 permits a current flow through a line 257 connecting with the closed contact plate 242 in the inching relay 170. The current will then flow through a line 258 and the line 190 to the limit switch 150. Depending upon the position of the limit switch 150, the current will be directed through the lines 195 or 199 to the actuating solenoids 196 or 200 of the spindle motor starting switches 197 and 198, respectively. No matter which switch is operatively closed to connect the motor 21 to the conductors $L^1$, $L^2$ and $L^3$, the motor will be energized to drive the transmission 19 and the spindles 45 for inching purposes.

From the foregoing description and explanation of the operation of the milling machine herein set forth to exemplify the invention, it should be apparent that a new and improved machine tool especially adapted to high speed production milling and boring operations has been provided wherein the sequence of operation is electrically controlled with a high degree of accuracy.

Although the illustrative embodiment of the invention has been described in considerable detail for the purpose of setting forth an operative and practical exemplifying structure, it is to be understood that the various structure and electrical control systems herein described are illustrative only and that various characteristics of the invention may be incorporated in other structural forms without departing from the spirit and scope of the invention, as described in the subjoined claims.

The principles of the invention having now been fully explained in connection with the foregoing description of an illustrative preferred embodying structure, we hereby claim as our invention and discovery:

1. In a machine tool, a base, a work support carried by said base, a tool support movably mounted on said base in cooperating relationship with said work support, a tool spindle rotatably mounted in said tool support, a motor carried by said tool support and operatively connected to rotate said spindle, a driving nut rotatably mounted in said tool support, an irreversible drive mechanism operatively connecting said motor to said nut to drive it for advancing said tool support in synchronism with rotation of said spindle, a feed screw rotatably mounted in said base and having threaded relationship with said nut in said tool support, a motor mounted in said base for driving said screw to effect movement of said tool support at rapid traverse rate, and an irreversible drive mechanism operatively connecting said motor to said screw, the arrangement being such that either said nut or said screw may be driven to effect movement of said tool support at feed or rapid traverse rate respectively, said irreversible drive mechanisms serving to prevent rotation of said nut by said screw or vice versa.

2. In a machine tool, a movably mounted spindle supporting head, a spindle rotatably mounted in said head, a screw and nut mechanism operatively arranged to effect movement of said head, a motor carried by said head, power transmitting means operatively connecting said motor to said spindle to rotate it, irreversible driving means operatively connecting said motor to one element of said screw and nut mechanism for effecting movement of said head in synchronism with rotation of said spindle, a separate motor for effecting movement of said head at rapid traverse rate, and another irreversible driving means operatively connecting said rapid traverse motor to another element of said screw and nut mechanism.

3. In a machine tool, a base, a table slidably mounted on said base, a headstock slidably mounted on said base, a detachable spindle head attached to said headstock, a plurality of spindles operably mounted in said head, a motor driven transmission operably disposed in said headstock and connected to drive said spindles, a speed selection mechanism connected with said transmission to provide a selective range of speeds for said spindles, a second transmission driven from said first-named transmission, a nut operably mounted in said headstock and driven from said second transmission, a screw mounted in said base to receive said nut, and a feed selection mechanism connected with said second transmission to provide a wide range of feed rates for said headstock directly proportional to the speed rate of said spindles.

4. An electrical control circuit for automatically controlling the operation of a machine tool comprising a motor connected to effect movement of a machine member, selectively at one of a plurality of feed rates, a second motor connected to effect a machine member movement at a fixed feed rate, a power source connected to energize said motors, a control circuit connected to selectively control the energization of said motors, a timing relay in said circuit selectively operable to disconnect said first-mentioned motor after a predetermined time interval and another timing relay in said circuit selectively operable to disconnect said first-mentioned motor after a predetermined time interval and to connect said second motor to said power source.

5. An electrical machine tool control system comprising a movable machine element, a motor connected to drive said movable machine element, a second motor connected to drive said element, an electric control circuit operably disposed to selectively energize said motors to effect a desired operating cycle, a timing relay in said circuit disposed to disconnect said first-mentioned motor after a predetermined time interval at a selected point in the operating cycle, a second timing relay in said circuit disposed to disconnect said first-mentioned motor after a predetermined time interval and to connect said second motor to effect movement of said machine element, and a switch in said circuit operable to select the one or the other of said timing relays.

6. An electrical control system for a machine tool having a base, a work retaining table slidably mounted on said base, a headstock including an interchangeable tool retaining spindle attachment slidably mounted on said base, a screw and nut drive mechanism operably connected to drive said headstock, and comprising a motor connected to drive said mechanism at feed rate, a second motor connected to drive said mechanism at rapid traverse rate, a plurality of adjustable switches operably engageable at predetermined positions of headstock movement, an electric brake associated with said second motor and disposed to brake rapid traverse movement of said headstock, an electrical control circuit interconnecting said switches, motors and electric brake, a timing relay in said electrical control system operative to render said first mentioned motor inoperative, a second timing relay in said system operative to render said first-mentioned motor inoperative and to render said second motor operative, and a switch arranged to select the one or the other of said timing relays for operation in said control system, whereby said motors and brake may be sequentially energized to effect an operating cycle for said headstock as predeterminately selected through the adjustment of said switches.

7. In a machine tool, a base, a table slidably mounted on said base, a power driven headstock including an interchangeable tool retaining spindle attachment slidably retained on said base, a motor connected to drive said headstock at feed rate, a second motor connected to drive said headstock at rapid traverse rate, a plurality of adjustable switches disposed to be operatively engaged at predetermined positions of headstock travel, an electrical control circuit interconnecting said motors and said switches and disposed to energize said motors and effect a desired operating cycle, a timing relay in said circuit operative to disconnect said first-mentioned motor after a predetermined time interval in the operating cycle, a second timing relay in said circuit operative to disconnect said first-mentioned motor and to connect said second-named motor to drive said headstock at rapid traverse rate, and a switch in said circuit operative to select the one or the other of said timing relays for controlling said headstock, whereby the operating cycle is readily varied for a particular machining operation by predeterminately setting said electrical control system.

JOSEPH B. ARMITAGE.
JOHN B. LUKEY.
KURT A. RIEDEL.
FRANCIS D. BOEHMER.

REFERENCES CITED

The following references are of record in the file of this patent:

UNITED STATES PATENTS

| Number | Name | Date |
| --- | --- | --- |
| 1,796,332 | Johnson | Mar. 17, 1931 |
| 2,023,841 | Kingsbury | Dec. 10, 1935 |
| 2,029,335 | Oberhoffken et al. | Feb. 4, 1936 |
| 2,040,872 | Oberhoffken | May 19, 1936 |
| 2,054,760 | Oberhoffken | Sept. 15, 1936 |
| 2,251,863 | Young | Aug. 5, 1941 |
| 2,333,341 | Scrivener | Nov. 2, 1943 |
| 2,387,820 | Armitage et al. | Oct. 30, 1945 |
| 2,398,346 | Anderson | Apr. 16, 1946 |